United States Patent
Khasis

(10) Patent No.: US 9,792,567 B2
(45) Date of Patent: Oct. 17, 2017

(54) METHODS AND SYSTEMS FOR MANAGING LARGE ASSET FLEETS THROUGH A VIRTUAL REALITY INTERFACE

(71) Applicant: Route4Me, Inc., Fort Lee, NJ (US)

(72) Inventor: Dan Khasis, Fort Lee, NJ (US)

(73) Assignee: Route4Me, Inc., Fort Lee, NJ (US)

(*) Notice: Subject to any disclaimer, the term of this patent is extended or adjusted under 35 U.S.C. 154(b) by 0 days.

(21) Appl. No.: 15/599,426

(22) Filed: May 18, 2017

(65) Prior Publication Data

US 2017/0262786 A1 Sep. 14, 2017

Related U.S. Application Data

(63) Continuation-in-part of application No. 15/456,521, filed on Mar. 11, 2017.

(60) Provisional application No. 62/338,487, filed on May 18, 2016, provisional application No. 62/372,313, filed on Aug. 9, 2016, provisional application No. 62/436,449, filed on Dec. 20, 2016, provisional application No. 62/307,402, filed on Mar. 11, 2016.

(51) Int. Cl.
| | |
|---|---|
| *G06Q 10/06* | (2012.01) |
| *G06Q 10/08* | (2012.01) |
| *G06Q 10/10* | (2012.01) |
| *G08G 1/00* | (2006.01) |

(52) U.S. Cl.
CPC . *G06Q 10/063114* (2013.01); *G06Q 10/1097* (2013.01); *G08G 1/20* (2013.01); *G08G 1/202* (2013.01); *G08G 1/205* (2013.01); *G06Q 10/08355* (2013.01)

(58) Field of Classification Search
CPC ....... G06Q 10/063114; G06Q 10/1097; G06Q 10/08355; G08G 1/20; G08G 1/202; G08G 1/205
See application file for complete search history.

(56) References Cited

U.S. PATENT DOCUMENTS

| | | | | |
|---|---|---|---|---|
| 5,958,012 A | * | 9/1999 | Battat | G06F 3/04817 709/221 |
| 8,275,508 B1 | * | 9/2012 | Adams | G07C 5/008 701/31.4 |
| 8,977,481 B1 | * | 3/2015 | Downs | G08G 5/0017 701/120 |
| 9,140,567 B2 | * | 9/2015 | Fryer | G01C 21/3407 |

(Continued)

*Primary Examiner* — Dale W Hilgendorf
(74) *Attorney, Agent, or Firm* — Ricky Lam

(57) ABSTRACT

Methods and systems for monitoring and interacting with a collection of geospatially aware assets, or any connected geo-location enabled device, through a virtual reality interface are disclosed. A diagram may be utilized as a real-time route progress indicator to determine a route's completion status and as a destination position indicator to determine the position of a destination among all destinations of a route. The virtual reality environment may provide the benefit of, and ability to, modify the visual field, such as to fit a large number of routes, e.g., 50,000 or more, onto an area viewable in the virtual reality environment to efficiently manage large fleets, or to divide a screen into a plurality of individual screens to organize the data in a visually effective manner. The user interface may be personalized for the user, or customized for a specific business operation.

2 Claims, 14 Drawing Sheets

(56) References Cited

U.S. PATENT DOCUMENTS

| | | | | |
|---|---|---|---|---|
| 2004/0030572 A1* | 2/2004 | Campbell | ........ | G06Q 10/08355 701/532 |
| 2010/0205022 A1* | 8/2010 | Brown | ............. | G06Q 10/06311 705/7.11 |
| 2016/0379168 A1* | 12/2016 | Foerster | ........... | G06Q 10/08355 705/7.16 |

* cited by examiner

METHODS AND SYSTEMS FOR MANAGING LARGE ASSET FLEETS THROUGH A VIRTUAL REALITY INTERFACE

CLAIMS OF PRIORITY

This patent application is a continuation-in-part and claims priority from:

(1) U.S. utility patent application Ser. No. 15/456,521, entitled 'Complex dynamic route sequencing for multi-vehicle fleets using traffic and real-world constraints' filed on Mar. 11, 2017, which claims benefit of U.S. provisional patent application No. 62/307,402, entitled 'Complex dynamic route sequencing for multi-vehicle fleets using traffic and real-world constraints', filed Mar. 11, 2016.

(2) U.S. provisional patent application No. 62/338,487, entitled 'Method and system for managing large vehicle fleets through a virtual reality environment', filed May 18, 2016.

(3) U.S. provisional patent application No. 62/372,313, entitled 'Methods and systems for detecting and verifying route deviations', filed Aug. 9, 2016.

(4) U.S. provisional patent application No. 62/436,449, entitled 'Autonomous supply and distribution chain', filed Dec. 20, 2016.

FIELD OF TECHNOLOGY

This disclosure relates generally to asset management systems, and more particularly for monitoring and interacting with a large asset fleet through a virtual reality interface.

BACKGROUND

Many different types of services use fleet tracking systems, including vehicle for hire services that transport persons, e.g., taxi, limousine, bus, and shuttle companies, delivery companies that transport goods, e.g., local and long haul trucking companies, and business service companies, e.g., plumbers, utilities, and exterminators. There may be many operational constraints and complexities in an asset fleet operation, such as route optimization, route management, user and asset management, schedule management, warehouse and inventory management, and communication management between administrators and in-field assets. Fleet administrators need to know where each asset in the fleet is located and what it is doing in order to make well-informed decisions, such as, on how to use the assets most efficiently, reduce fraud, increase safety, and etc.

Fleet tracking serves a variety of functions, including asset tracking, destination tracking, geo-fence detection, time card tracking, fuel card usage, fuel card tracking, and speed limit compliance. To accomplish this, the fleet tracking service must perform the basic function of locating the positions of assets in the fleet. This may be done through a variety of technologies, but is often achieved through the use of global positioning system (GPS) tracking devices installed in the assets or GPS enabled smartphones carried by an operator. The geographic position and sometimes additional information, e.g., speed, heading, and oil levels, are relayed from the assets to a central processing system using some form of wireless communication channel, e.g., cellular tower, WI-FI, or the Internet.

Currently, wireless voice communication between administrators and operators is the primary means of updating the administrator of the status of each asset of a route. As a secondary means of communication, administrators and operators may use bi-directional or two-way messaging by e-mail, a mobile application, a chat service, or any other means of electronic communication. A limitation of current systems is that large amounts of data cannot be displayed on a single screen and can require many screens in a logistics or operational command center. Even with multiple large high-resolution screens or multiple high-resolution projectors, there are limits on how many routes can be viewed concurrently. The systems may be unable to accommodate the needs of large asset fleets, such as fleets comprising hundreds, tens of thousands, or even hundreds of thousands of assets operating in a plurality of geographic regions. The large number of screens also consumes a considerable amount of energy and space.

Another limitation of current systems is that they mostly analyze route deviations in a textual and/or numeric format. For example, an automated monitoring system may notify an administrator about a route stop lateness, route deviation, route violation and etc., but the notification occurs immediately before or at the time of the action. With current systems, administrators cannot see a visual representation of any of the violations or progress indicators in an interface designed to concurrently view many routes.

Thus, there is a need for a tracking system to collect information from a high number of assets and to aggregate this information into a centralized data pool, and to present it to a system administrator in a format that is intuitive and allows for effective decision-making.

SUMMARY

Disclosed are methods and systems for monitoring and interacting with a large asset fleet through a virtual reality interface.

In one aspect, the present invention discloses an improved method and system to monitor and manage a large asset fleet through a central user interface. A graphical diagram may be utilized as a real-time route progress indicator to determine a route's completion status and as a destination position indicator to determine the position of a destination among all destinations of a route. A route matrix may present to a viewer, such as a user or an administrator of the system, a simplified graphical representation to easily detect status of a large number of destinations and routes through the use of route line segments comprising one or more nodes, unique symbol identifiers of the nodes, and color-coding of the nodes, which may not have been achievable with previous implementations of route monitoring systems and methods.

The system of the present invention may rely on one or more data sources based on current and future traffic predictions by a route optimization engine, which has been described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes.

Further, the present invention discloses a system and a method to enhance the implementation of the route matrix to monitor and manage an asset fleet through a central user interface of a virtual reality environment. The virtual reality environment may provide the benefit of, and ability to, modify the visual field, such as to fit a large number of routes, e.g., 50,000 or more, onto an area viewable in the virtual reality environment to efficiently manage and monitor large asset fleets, or to divide a virtual screen into a plurality of individual screens to organize the data in a visually effective manner. Separate route operation matrices may be displayed on each of the multiple screens.

In another aspect, a 2D or 3D map comprising one or more routes of an asset fleet may be displayed on a screen of the virtual environment. The map may include geographic data, coordinates data, user and asset data, and route data that may pertain to a particular geographic region. The user and asset data, e.g., GPS tracking data, may be shown with spatial clustering enabled or disabled. Disabling spatial clustering may allow for the ability to view all operators and assets in a fleet independently and with the precise location of each asset on the map. The tracking data may include geo-fence data, e.g., alerting an administrator when an operator or asset enters a geo-fence area, and route deviation data, e.g., alerting an administrator when an operator or asset deviates from the planned or sequenced route. The map may comprise 3D data visualization, zoom functionality, and rotatable y-axis, or x-axis (and z-axis if the map is 3D). The administrator may interact with the map and routes, such as to dispatch one or more operators or assets to congregate at one or more locations by selecting one or more points on the map, or to assign an address or a route to a user or asset.

A summary table of route metrics and information about operators and assets may be displayed on one or more of the virtual screens. Route data may be divided into sections, such as, e.g., operational data, utilization data, distance data, time data, rates data and density data. An activity feed may be displayed to allow visibility into the activities of a route and its operators and assets, as well as robotic assets and self-driving assets. The activity log may allow an administrator to efficiently keep track of a fleet's operations, such as, e.g., operator check-in and check-out times, modifications to a route, notes added to a route, personnel reassignments, automatically detected route deviations, and route status alerts. A chat board or forum may be used separately or in conjunction with the activity feed, such as to allow communication among administrators, users, and assets.

In yet another aspect, a system and a method of the present invention may generate a graphical interface of routes and assets in a timeline format. The timeline may comprise information that pertains to one or more routes, such as, e.g., start time, end time, current time, starting destination, ending destination, and visited destinations and unvisited destinations, and information that pertains to operators and/or assets, e.g., speed, location, idling status and congregation status. The timelines for multiple routes or assets may be displayed in parallel, allowing comparison between the routes and assets. The graphical timelines may be used to track hundreds, thousands, or even tens of thousands of assets when implemented in a virtual reality environment, and may be implemented in real-time or non-real time.

In yet another aspect, a warehouse or facility may be displayed in a three dimensional virtual environment, such as to a user of a VR device, e.g., HMD. One or more cameras may be positioned within the warehouse to retrieve visual data of the warehouse, such as inventory data, infrastructure data, and human and machine operator data In yet another aspect, the system may allow an administrator to dynamically customize and modify a virtual reality environment for managing an asset fleet of a user of the virtual environment. A backend server may comprise a control utility that may permit the administrator to modify the user interface of the user to personalize for the user, or to customize for business or fleet operational goals.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are systems and methods for monitoring and interacting with a collection of geospatially aware assets, or any connected geo-location enabled device, through a virtual reality interface. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

Figure 1:
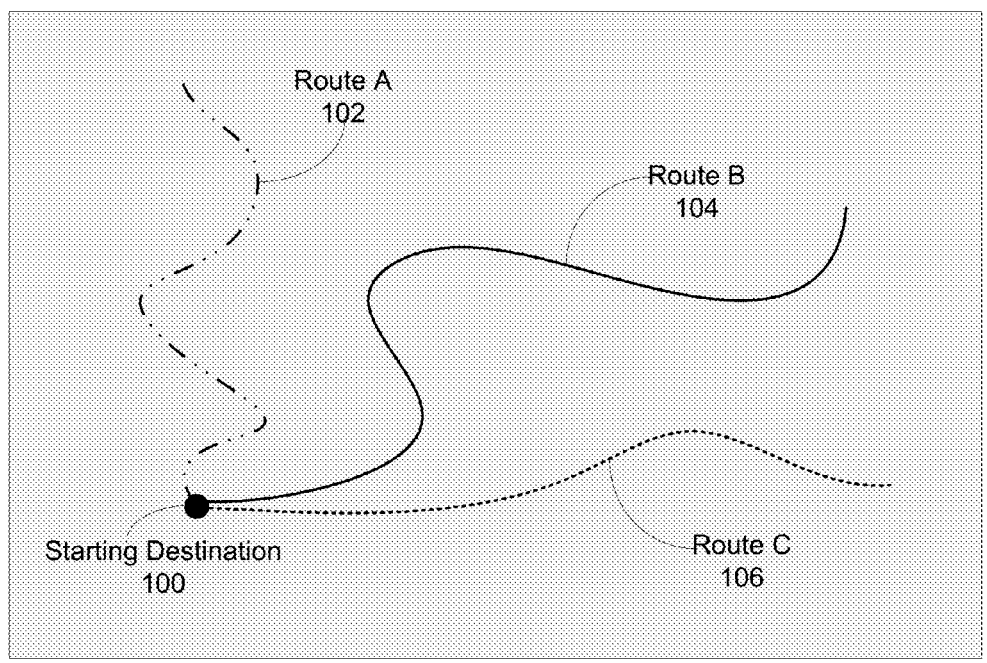
FIG. 1 is a prior art diagram of a sample route display.

FIG. 1 is a prior art diagram of a sample route display. Starting destination 100 may indicate a point that driving routes begin, such as a storage facility or a supply depot. Route A 102, route B 104, and route C 106 may be overlaid on top of a map of a geographic region of vehicle operation.

Data and metadata about each route may be presented on the display in addition to the graphic representations. Although multiple routes may be presented on a single display, it is evident that a large number of routes may not be practically shown, such as, e.g., greater than 10, in-part due to the complex two-dimensional shape of the routes that creates a crowded and cluttered user interface in which it is difficult to monitor many routes concurrently. In addition, the graphical representations of the route may not provide adequate information to an administrator of an asset fleet management system who may rely on the data to analyze and plan new routes, or to modify existing ones in progress.

In at least one embodiment, the present invention discloses an improved method and system to monitor and manage a large asset fleet through a central user interface. An asset may be human operated or self-driving, such as an autonomous asset. A graphical diagram may be utilized as a real-time route progress indicator to determine a route's completion status and as a destination position indicator to determine the position of a destination among all destinations of a route.

Figure 2:
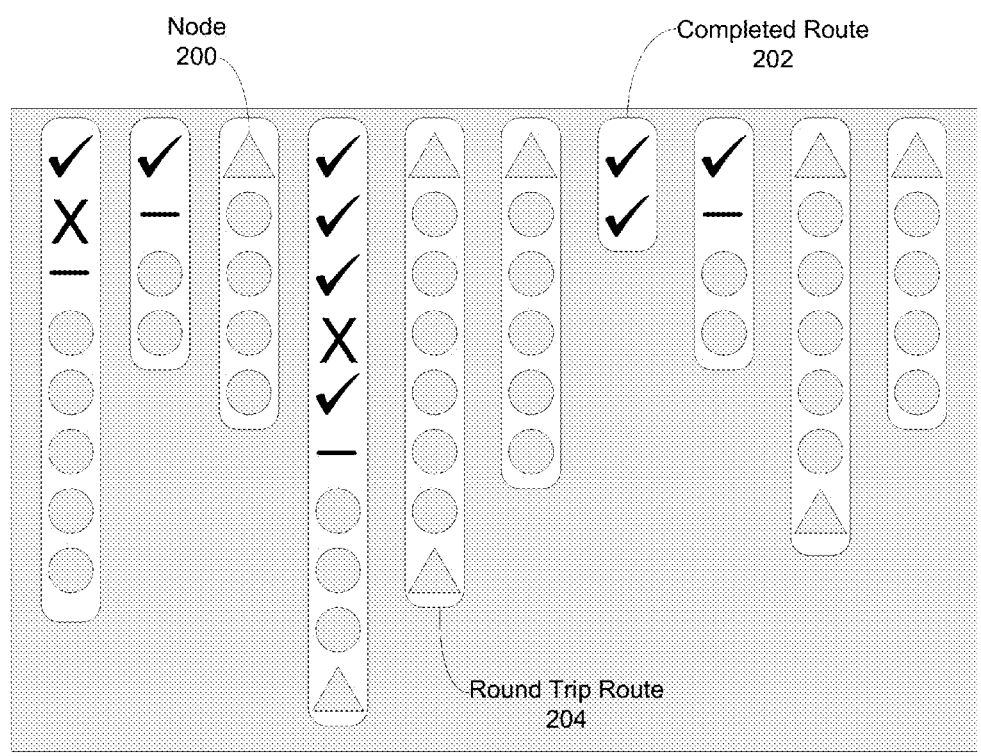
FIG. 2 is a diagram of a route operation matrix, according to at least one embodiment.

FIG. 2 is a diagram of a route operation matrix, according to at least one embodiment. The diagram may be presented in two dimensions and may be divided by routes represented by one-dimensional line segments comprising one or more node 200. Each node 200 of a route may indicate a particular place or location of a geographic area, such as a destination on the route. The nodes may comprise various unique symbols to indicate destination status, such as a starting destination, a pending destination, a current destination, a visited destination, and an end destination. Typically, the first destination of the route is the starting destination, which may be indicated by a triangle shape and/or located at the highest position and/or top most position and/or left most position in the route; however, the icons or icon position alignment can be adjusted by an administrator. As a route progresses, downward movement is observed on the route matrix such that a destination where an asset or operator of the route is currently located in the real world may be marked with its own unique identifier, such as a dash mark. A change in symbol of the starting destination, such as, to the symbol of a current destination may indicate that the route has begun implementation or execution by the operator or asset assigned to the route. Once the operator or asset leaves the current location, the visited destination may then be marked with its unique identifier, such as a checkmark. Generally, the current destination of the operator or asset of the route is the destination directly following the most recent visited destination, except if it is the starting destination. Additionally, routes that may require attention of the administrator, such as due to a problem with a customer or address on the route, may be marked, e.g., with a cross mark. A route that comprises all destinations that have changed from its initial symbol, such as a route with all checkmarks, may indicate that it is a completed route 202. On the other hand, a route that has one or more destinations comprising its initial symbol may indicate that the route is still in progress.

Each node 200 may be modifiable and interchangeable, such as, e.g., a new destination may be added, an existing destination may be removed, and two or more existing destinations may be interchanged, such as a couple of destinations swapping positions, three or more destinations moving one or more positions in a round-robin schema, or any other configurations. The nodes may be modified within each route or among any of the other routes, and may span a plurality of geographies. In addition, the size, e.g., width and/or length of each node 200 may increase or decrease in conjunction with the duration of a service time for each destination. Service time may be defined as the amount of time spent at a destination to complete the intended operation or service.

The initial symbol of a destination may indicate the type of destination, such as, a circle may indicate that it is a customer destination, and a triangle may indicate it is a starting destination and/or the destination is a storage facility. In the example of the figure, a triangle symbol located at the last destination may indicate that it is a round trip route 204, if the symbol is referring to the same location or storage facility as the starting destination Like symbols, such as the triangle symbol representing a same depot or a different depot may have further markings to differentiate, such as a numeric marking or an alphabet marking. In some embodiments, the routes may be presented in rows, e.g., X-axis, instead of columns, e.g., Y-axis, and the symbols may be interchangeable and may comprise any shape or graphical depiction.

In addition to unique graphical representations of the nodes to indicate destination status, the nodes may be color-coded, wherein a unique color scheme is used to indicate whether unvisited destinations are expected to be visited ahead of schedule, on schedule, or behind schedule. Visited destinations may also be color-coded to indicate whether actual visited times by the operator or asset were ahead of schedule, on schedule, or behind schedule. The color-scheme may have gradient levels of shading to indicate degree levels of a destination's expected and actual visited times in relation to its scheduled time, or dynamically projected arrival and departure times. For example, if a destination is indicated with the color red when the destination is expected to be visited behind schedule, and if a destination is indicated with the color green when the destination is expected to be visited is ahead of schedule, then a destination that is expected to be on-time may have a color that is a blend of red and green, such as yellow. Different degrees of the gradient may also be used, for example, if the destination is expected to be visited slightly early (between on-time and ahead-of-schedule), then a color mixture of yellow and green may be used, such as light green. The opposite may also be true, wherein if a destination is expected to be visited slightly late (between on-time and behind-of-schedule), then a color mixture of yellow and red may be used, such as orange.

The system of the present invention may rely on one or more data sources to determine whether each destination is early, on-time, or late based on current and future traffic predictions by a route optimization engine, which has been described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes.

In summary, the route matrix may present to a viewer, such as a user or an administrator of the system, a simplified graphical representation to easily detect the status of a large number of destinations and routes through the use of route line segments comprising one or more nodes, unique symbol identifiers of the nodes, and the color-coding of the nodes, which may not have been achievable with previous implementations of route monitoring systems.

Although the diagram in FIG. 2 shows 10 routes aligned with the starting destinations on the X-axis of its two dimensional shape, the diagram may comprise much higher route density, depending on available screen space relative to the width thickness of the route line segments. Generally, a thinner width of the routes and a large screen space allows for more routes to be displayed; however, for practicality and ease of viewing, each screen may comprise up to 1,000 displayed routes. In some embodiments, a virtual reality environment may allow for a single virtual screen to comprise up to 50,000 routes being displayed. In some embodiments, the routes may be presented in rows, e.g., X-axis, instead of columns, e.g., Y-axis.

Figure 3:
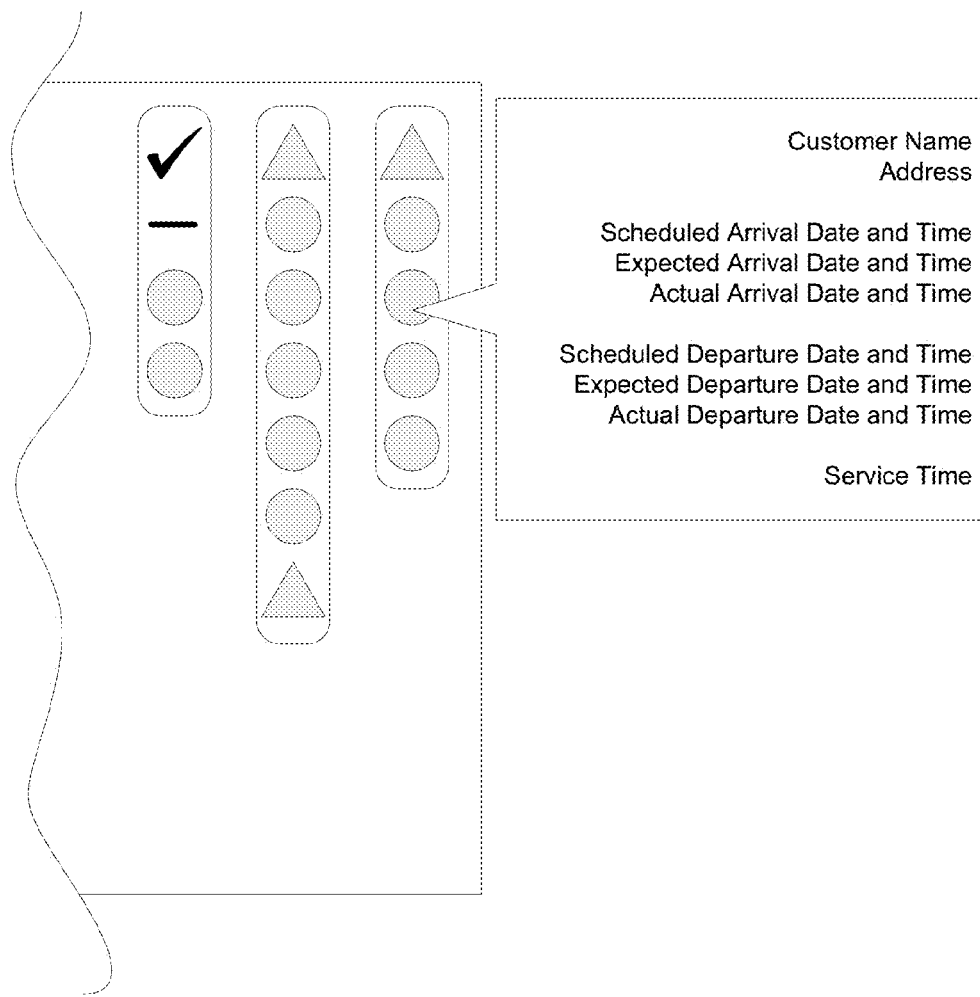
FIG. 3 is a close view of a cut-out portion of a route operation matrix, according to at least one embodiment.

FIG. 3 is a close view of a cut-out portion of a route operation matrix, according to at least one embodiment. A user of the system may roll a cursor above a node through an input device to display data and metadata about the destination. A few example data that may be retrieved and displayed includes, e.g., customer name, address, scheduled arrival date and time, expected arrival date and time, actual arrival date and time, and service time. Service time may be defined as the amount of time spent at a destination to complete the intended operation or service. In addition, the size, e.g., width and/or length of each node may increase or decrease in conjunction with the duration of the service time for each node on a route. Expected arrival and departure data may be updated in real-time based on traffic conditions and/or operation of the route, such as whether previous stops were on-time, late, and etc.

In at least one embodiment, the present invention discloses a method and a system to enhance the implementation of the route matrix to monitor and manage one or more asset fleets through a central user interface of a virtual reality environment. The virtual reality environment may provide the benefit and ability to modify the visual field, such as to fit a large number of routes, e.g., 50,000 or more, onto an area viewable in the virtual reality environment to efficiently manage and monitor large asset fleets, or to divide a single screen into a plurality of individual virtual screens to organize the data in a visually effective manner. Prior art systems and methods, such as the one described in FIG. 1 may also be implemented on a single large screen or multiple screens, however, due to the previously mentioned disadvantage of spatial crowding, a large number of routes may not be practically achieved. In addition, due to the lack of graphical organization of FIG. 1 compared to the route matrix of the present invention, a user may be visually inundated, which may cause attention impairment.

Figure 4:
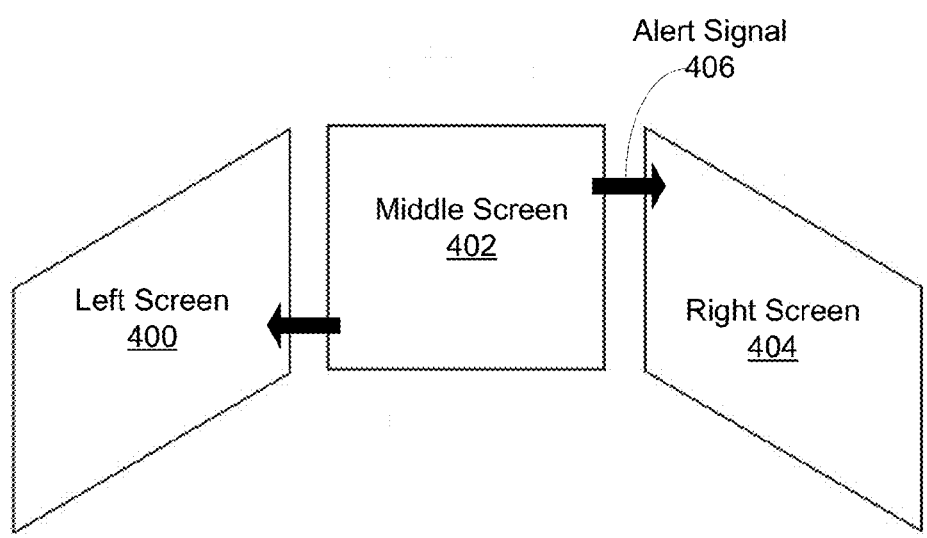
FIG. 4 is an example virtual reality environment wherein the present invention may be implemented, according to at least one embodiment.

FIG. 4 is an example virtual reality environment wherein the present invention may be implemented, according to at least one embodiment. A virtual device such as a head-mounted display (HMD) may be used to access the virtual reality environment. The virtual reality environment's visual field may be divided into three separate screens, such as a left screen 400, a middle screen 402, and a right screen 404. In some embodiments, a single screen may be used in substitute of the multiple screens, and multiple screens may be divided into an infinite number of individual screens. Whether single or in multiple, each screen is configured in three-dimensional space in relation to position, height, width, and rotation. The screen frames may be transparent or translucent, and may comprise selectable options embedded within the screens in the form of links and buttons. A user of the system, such as an administrator, may interact with each screen, which may include clicking on a link or a three dimensional cube, scrolling a page, selecting a map, and etc. Screen configurations in addition to amount of screens, layout and position, and design may be adjustable and personalized to the user.

Separate route operation matrices may be displayed on each of the multiple screens. Each matrix may comprise a plurality of routes, e.g., 1-1,000 routes (or more), allowing an administrator of the system to efficiently monitor a large total number of assets simultaneously, such as in the hundreds, e.g. 100 to 999 routes, or in the thousands, 1,000 to 999,999 routes, which prior art systems may not be able to accomplish. A single large screen comprising up to 999,999 routes of one or more matrices may also be employed. The division of the visual field may provide the benefit of organizing data, such as routes that are of a west geographic region may be positioned on the left screen 400, routes of a central geographic region may be positioned on the middle screen 402, and routes of an east geographic region may be position on the right screen 404. Additionally, the geographic regions may be organized by route density data. For example, routes of the lowest density of the west region will only be shown on the left screen 400 while routes of the highest density of the east region will only be shown on the right screen 404. The user of the system may switch screens for one or more route matrices, such as to move a route matrix from the left screen to the right screen.

The system may allow the user to select among the multiple screens, and may be alerted to an activity on a target screen based on an alert signal 406. The alert signal 406 may be a visual signal, an auditory signal or a kinetic signal such as a vibration. The user may use a cursor of a mouse to scroll among the multiple screens, or the user may use body gesture commands, such as a wave of a hand in the direction of the alert, and thus the target screen. The user may also use an augmented reality brain scanner to think about which direction or specific screen to view in greater detail, or use voice command and/or a voice recognition system to select a specific route or specific stop on a route. In addition, the system may allow for the ability to virtually grab hold or pick up a node, e.g., destination or stop, of a route from within the route matrix to re-position the node within the same route or among another route of the matrix—or the node may be completely removed. A new destination may be picked up from an address book or a customer relationship management (CRM) system, and dropped into the desired position of a desired route of a plurality of routes of the matrix. If gesture command is used, the system may be interacted with gestures through either a control device, or a gesture recognition camera. The gesture recognition camera may be interacted by the user in two-dimensional space, or a couple of gesture recognition cameras may be interacted by the user in three dimensions, thus allowing more gesture variety, and better gesture tracking and identification compared to a single camera in two dimensions. A gesture recognition device may also be embedded into the virtual reality headset, or may be integrated into the system to affect the viewport within the virtual reality headset environment.

Figure 5:
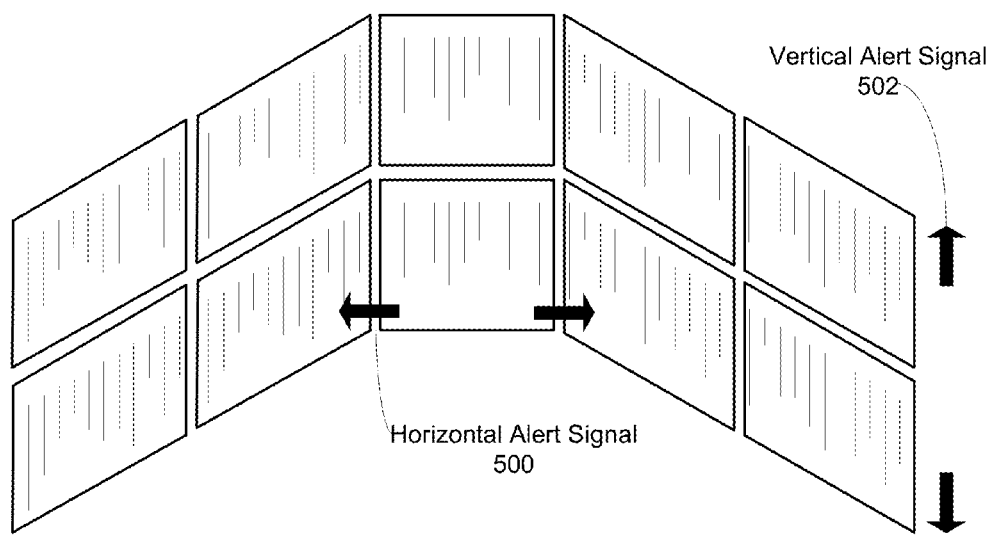
FIG. 5 is an example virtual reality environment comprising a high screen density wherein the present invention may be implemented, according to at least one embodiment.

FIG. 5 is an example virtual reality environment comprising a high screen density wherein the present invention may be implemented, according to at least one embodiment. A virtual device such as a head-mounted display (HMD) may be used to access the virtual reality environment. For example, the virtual reality environment's visual field may be divided into three separate sets of screens, such as a left screen set, a middle screen set, and a right screen set. Each set of screens may comprise one or more screens, such as a set of four screens on the left, a set of two screens in the middle, and a set of four screens on the right. The screens may also be divided into a set of top screens and a set of bottom screens for further organization. In some embodiments, a single screen may be used in substitute of the multiple screens, and multiple screens may be divided into an infinite number of individual screens. The one or more screens may also be positioned in a circular or semi-circular manner such that a user may be completely surrounded by the plurality of screens. Whether single or in multiple, each screen is configured in three-dimensional space in relation to position, height, width, and rotation. The screen frames may be transparent or translucent, and may comprise selectable options embedded within the screens in the form of links and buttons. The user of the system may interact with each screen, which may include clicking on a link or a three dimensional cube, scrolling a page, selecting a map, and etc. Screen configurations in addition to amount of screens, layout and position, and design may be adjustable and personalized to the user.

Separate route operation matrices may be displayed on each of the multiple screens. Each matrix may comprise a plurality of routes, e.g., 1-1,000 routes (or more), allowing an administrator of the system to efficiently monitor a large total number of assets simultaneously, such as in the hundreds, e.g. 100 to 999 routes, or in the thousands, 1,000 to 999,999 routes, which prior art systems may not be able to accomplish. A single large screen comprising up to 999,999 routes of one or more matrices may also be employed. The division of the visual field may provide the benefit of organizing data in a horizontal direction, such as routes that are of a west geographic region may be positioned on the left screens, routes of a central geographic region may be positioned on the middle screens, and routes of an east geographic region may be position on the right screens. In the present figure, the screens may also be divided in the vertical direction, such as routes of a northern geographic region may be positioned on the top screens, and routes of a southern geographic region may be positioned on the bottom screens. Additionally, the geographic regions may be organized by route density data. For example, routes of the lowest density of the west region will only be shown on the left screens while routes of the highest density of the east region will only be shown on the right screens. The user of the system may switch screens for one or more route matrices, such as to move a route matrix from a top left screen to a bottom right screen.

The system may allow the user to select among the multiple screens, and may be alerted to an activity on a target screen based on an alert signal within the virtual environment. The alert signal 406 may be a visual signal, an auditory signal or a kinetic signal such as a vibration. A horizontal alert signal 500 may prompt or instruct the user to divert attention to a screen either in the horizontal directions, e.g., left and right directions, and a vertical alert signal 502 may prompt the user to divert attention to a screen in the vertical directions, e.g., top and bottom directions. The user may use a cursor of a mouse to scroll among the multiple screens, or the user may use body gesture commands, such as a wave of a hand in the direction of the alert, and thus the target screen. The user may also use an augmented reality brain scanner to think about which direction or specific screen to view in greater detail, or use voice command and/or a voice recognition system to select a specific route or specific stop on a route. In addition, the system may allow for the ability to virtually grab hold or pick up a node, e.g., destination or stop, of a route from within the route matrix to re-position the node within the same route or among another route of the matrix—or the node may be completely removed. A new destination may be picked up from an address book or a customer relationship management (CRM) system, and dropped into the desired position of a desired route of a plurality of routes of the matrix. If gesture command is used, the system may be interacted with gestures through either a control device, or a gesture recognition camera. The gesture recognition camera may be interacted by the user in two-dimensional space, or a couple of gesture recognition cameras may be interacted by the user in three dimensions, thus allowing more gesture variety, and better gesture tracking and identification compared to a single camera in two dimensions. A gesture recognition device may also be embedded into the virtual reality headset, or may be integrated into the system to affect the viewport within the virtual reality headset environment.

Figure 6:
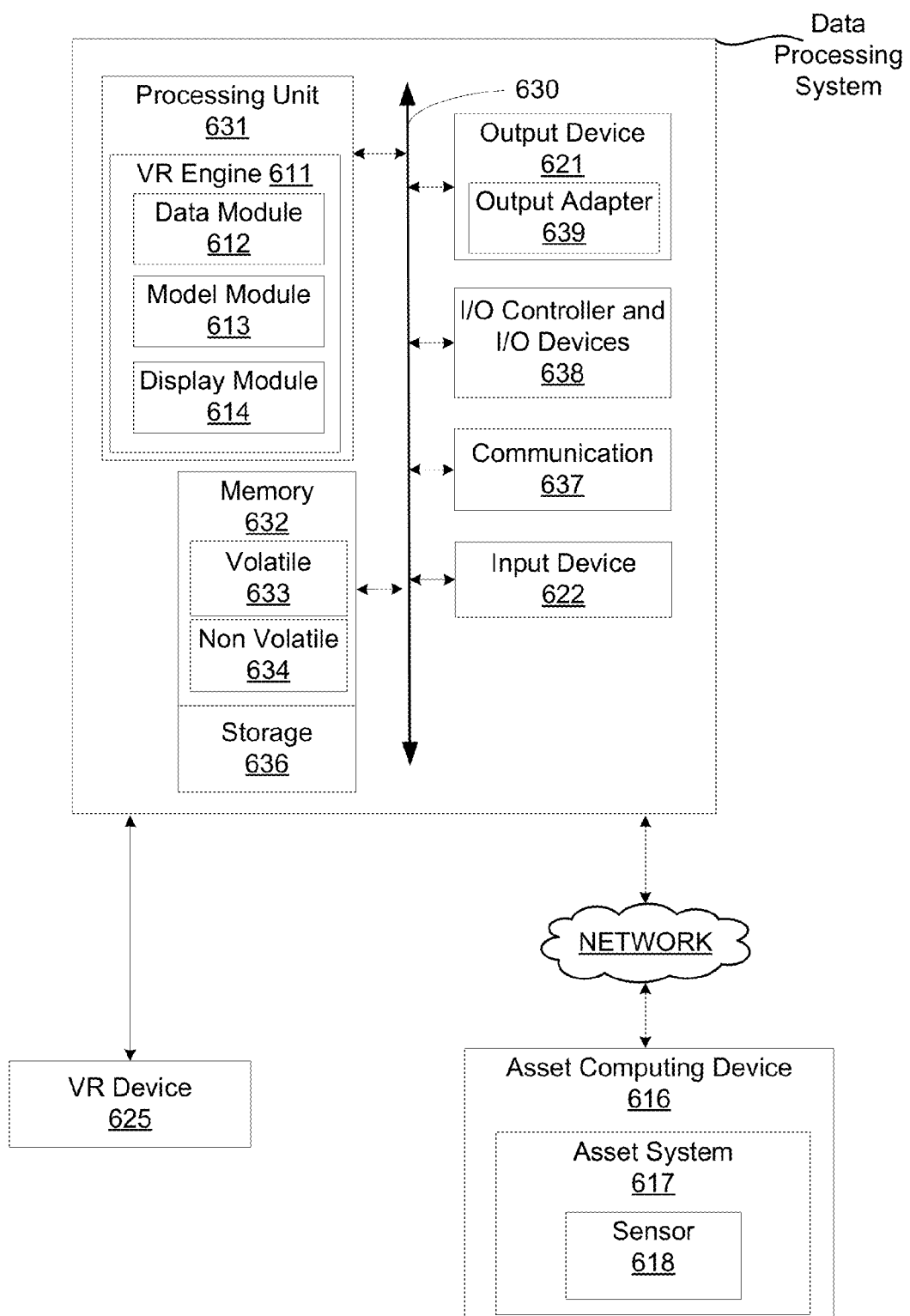
FIG. 6 illustrates a computing environment of a data processing system for implementing various aspects of the invention, according to at least one embodiment.

FIG. 6 illustrates a computing environment of a data processing system for implementing various aspects of the invention, according to at least one embodiment. The processing unit 631 may be any of various available processors, such as single microprocessor, dual microprocessors or other multiprocessor architectures. The processor may comprise a virtual reality (VR) engine 611 for providing a virtual reality environment to a user facilitated by the components of the data processing system.

The system bus 630 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 632 may include volatile memory 633 and nonvolatile memory 634. Nonvolatile memory 634 may include read only memory (ROM), programmable ROM (PROM), electrically programmable ROM (EPROM), electrically erasable ROM (EEPROM), or flash memory. Volatile memory 633, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

The mobile device also includes storage media 636, such as removable/non-removable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface may be used to facilitate connection.

The data processing system may further include software to operate in the computing environment, such as an operating system, system applications, program modules and program data, which are stored either in system memory 632 or on disk storage. Various operating systems or combinations of operating systems may be used.

Input device 622 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 638. Interface ports 638 may include a serial port, a parallel port, a game port, a universal serial bus (USB), and a 1394 bus. The interface ports 638 may also accommodate output devices 621. For example, a USB port may be used to provide input to the mobile device and to output information from the mobile device to an output device 621. Output adapter 639, such as video or sound cards, is provided to connect to some output devices such as monitors, speakers, and printers.

The data processing system may be communicatively coupled to remote computers, such as, e.g., the platform, through the network. The remote computers may comprise a memory storage device, and may be a personal computer, a server, a router, a network PC, a workstation, a microprocessor based appliance, a peer device or other common network node and the like, and typically includes many or all of the elements described relative to the data processing system. Remote computers may be connected to the data processing system through a network interface and communication connection 637, with wire or wireless connections. A network interface may be communication networks such as local-area networks (LAN), wide area networks (WAN) or wireless connection networks, or by cellular network communication technology. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

The VR device 625 may be any device that is communicatively coupled to the data processing system, and in particular, the VR engine 611, to facilitate and provide a dynamic virtual reality environment to the user. For example, VR device 625 may be a virtual reality tracking device, head-mounted display, virtual reality clothing, virtual reality input device, virtual reality glasses, camera tracking system in an asset for monitoring the user, the asset itself and/or the asset environment, and mobile electronic device.

In one embodiment, the VR device 625 may a head-mount display (HMD), which can be placed on a user's body, e.g., head, or attached on a helmet or goggles. The HMD may provide information about the user, such as, e.g., tracking information, orientation information, input information, and motion information, among others to the VR engine 611. The HMD may also provide a virtual view generated by the VR engine 611 to the user. In another embodiment, the user may be in possession of a mobile electronic device. The mobile electronic device, alone or in combination with the HMD, may provide information about the user and provide a virtual view generated by the VR engine 611 on the mobile electronic device. The HMD and/or the mobile electronic device may also include speakers or headphones for audio input and/or output. Various input/output technologies can be implemented with the systems and methods described herein, such as wireless or wired technology for computer communication. Other configurations and uses of the VR device 625 can also be utilized. For example, the user may use a controller device to interact with the data processing system either alone or in conjunction with the HMD.

The data processing system may also be communicatively coupled to an asset computing device 616 of an asset comprising one or more asset systems 617 through a network. The network may be a data network, the Internet, a wide area network or a local area network. The network serves as a communication medium to various remote devices, e.g., web servers, remote servers, application servers, intermediary servers, client machines, other mobile devices. The asset system 617 may include, but is not limited to, any automatic or manual systems that can be used to enhance the asset, driving and/or safety, such as, e.g., an asset speed sensor, accelerator pedal sensor, brake sensor, throttle position sensor, wheel sensor, anti-lock brake sensor, and camshaft sensor, among others. The asset system 617 may include and/or is communicatively coupled to one or more asset sensor 618 for sensing information associated with the asset, the asset environment and/or the asset system 617, such as, e.g., an asset state sensor, asset system state sensor, proximity sensor, vision sensors, audio sensor, position detection sensor, e.g., GPS, and other sensors. Specifically, the sensor 618 may be operable to sense a measurement of data associated with the asset, the asset environment, the asset system, and/or occupants of the asset, and generate a data signal indicating the measurement data. These data signals may be converted into other data formats, e.g., numerical and/or used by the asset system 617 and/or the asset computing device 616 to generate other data metrics and parameters. The asset computing device 616 can access and/or receive data, e.g., asset data, user data, and other data, e.g., route data, from a plurality of asset systems 617 and/or sensors 618.

The VR engine 611 may comprise a data module 612, a model module 613, and a display module 614, which may each access and/or receive asset data, user data, and route data, as well as communicate with the VR device 625 and/or the asset computing device 616 of an asset. The data module 612 may receive asset data the asset system 617, which may include asset data metrics and parameters derived from the asset sensor 618. For example, asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. In some embodiments, the asset data may be received from a third-party source through the network.

The data module may also receive user data, such as from a mobile device or VR device 625 of the user. The user data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. Another example of a VR device 625 may be an accelerometer sensor and/or gyroscope sensor that may help determine a position, a location and/or an orientation of the user. In some embodiments, the user data can be received from third-party sources such as through the network.

The model module 613 may generate a virtual view based on the asset data, the user data, route data, and/or a virtual world model. Generally, a virtual world model is a collection of individual operations and objects that define a virtual world and one or more virtual views. The virtual world model may be defined in various modeling and programming languages, such as, e.g., virtual reality modeling language (VRML), DirectX, OpenGL, and Unity, among others. The virtual world model and a design data can include design themes, software or program instructions to define and generate a virtual world and/or a virtual view. The model module 613 modifies and/or augments one or more components of the virtual world model based on the asset data, the route data and/or the user data. The memory and/or storage may store the aforementioned virtual world model and design data. The virtual world model and design data may also be received from a third-party source, such as through the network.

The display module 614 renders the virtual view from the model module 613 to an output device to update a display of the virtual view. For example, the display module 614 may render the virtual view to one or more of the VR device 625, e.g., the HMD. The display module 614 may determine asset motion data based on the asset data, and may determine user motion based on the user data. The asset motion data and/or the user motion data can be used to augment one or more components of the virtual world model, thereby controlling the output device to update display of the virtual view.

Figure 7A:
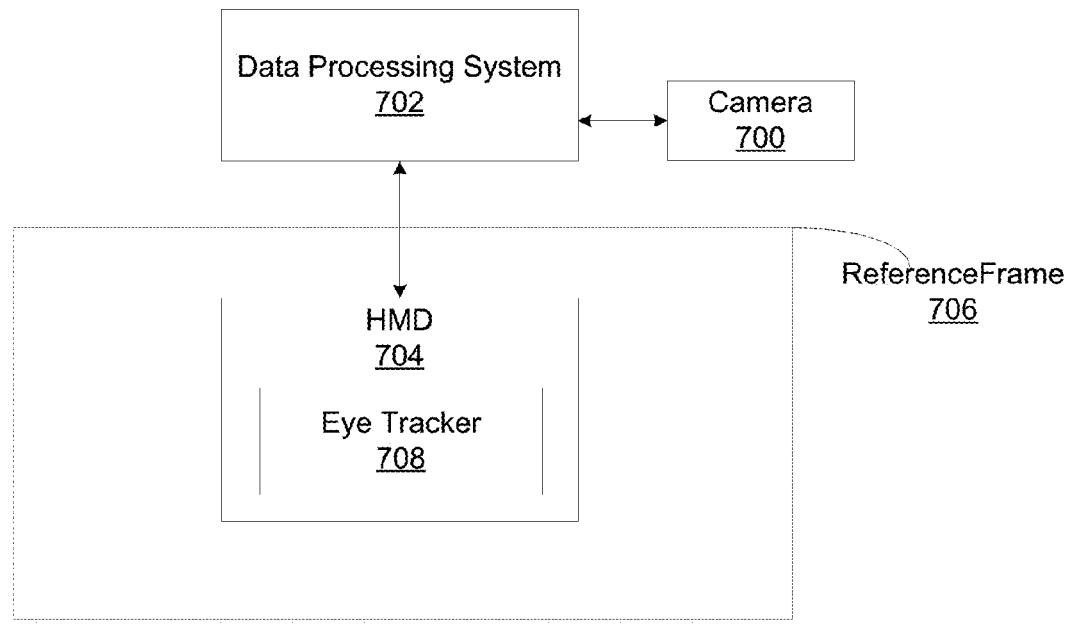
FIG. 7A shows a data processing system of the present invention coupled to a head-mount display to provide an interactive virtual environment to a user, according to at least one embodiment.

FIG. 7A shows a data processing system of the present invention coupled to a head-mount display to provide an interactive virtual environment to a user, according to at least one embodiment. A camera 700 may be communicatively coupled to a data processing system 702 to capture an image of an interior or exterior environment, e.g., a camera positioned to record an operator of an asset and/or a camera positioned to record the roadway the asset is traversing on. A head-mount display (HMD) 704 may be disposed within a reference frame 706 of the captured image for localizing the HMD 704 within the captured image.

The reference frame 706 may be a space for which a coordinate system or set of axes may be applied to measure the position, orientation, and other properties of the VR device, e.g., HMD 704. The localization of the HMD 704 within the reference frame 706 of the captured image may provide the basis for generating the virtual reality environment, and receiving and executing the commands of the user within the environment. The HMD 704 may provide a virtual view and a display of virtual controls at the disposal of the user based on the absolute position and orientation within the reference frame. Virtual controls may be defined as any type of control action asserted by the user associated with the virtual view, which may be identified by the data processing system 702 through a controllable device. A controllable device may be defined as any device or application in which the user is operating to interact with the virtual environment. In addition, applications may include software-based applications. Virtual information and virtual controls displayed to the operator by the HMD 704 include, e.g., fleet monitoring data, asset operating conditions, route data, and navigation data. The HMD 704 may comprise an eye tracker 708 to track the user's eye movements, which may also comprise a control action. The eye tracker 708 may utilize separate video feeds to each eye of the user.

Visualization of the virtual view is typically accomplished by means of an HMD disposed in a helmet or goggles worn on the user's head with an electronic display mounted in front of the user's eyes. A housing may surround the display to reduce or eliminate ambient light. In some systems, stereoscopic vision is facilitated through the use of a pair of display, each aligned with one of the user's eyes. More compact configurations may be achieved by mounting the displays relatively close to the eyes, typically within 3 to 4 inches, and providing short focal length and wide-angle lenses between each eye and the associated display.

Large displays may be used at relatively close range and utilizing Fresnel lenses to provide wider field of view. Vision is further improved by the use of multiple lenses. A pair of lenses may be arranged in parallel in a configuration called a 'short focal length' condenser pair. In a head-mount display, design goals may include weight reduction and minimum front projection, which may be the distance from the face of the wearer to the outer extent of the housing when the headset is in operation.

Figure 7B:
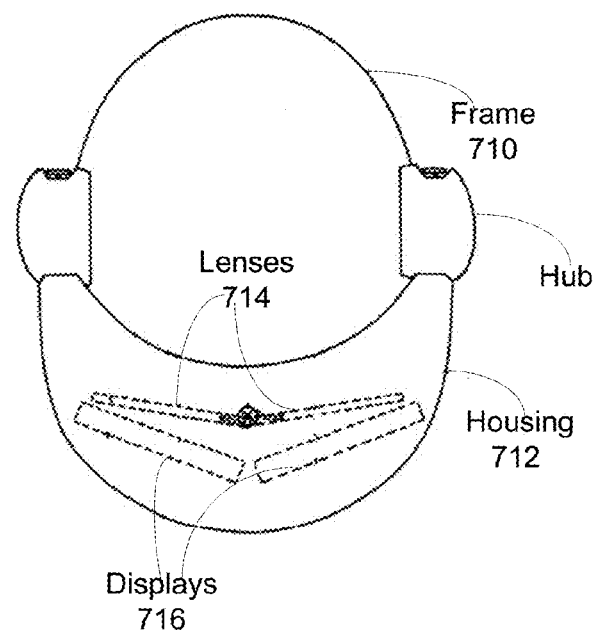
FIG. 7B illustrates a top view of a virtual reality head mount display used in the implementation of an aspect of the present invention, according to at least one embodiment.

FIG. 7B illustrates atop view of a virtual reality head-mount display used in the implementation of an aspect of the present invention, according to at least one embodiment. The HMD may comprise a frame 710, shell, or elastic band designed to be worn on and around a user's head. Typically, the shell or frame 710 will have an interior suspension which adapts the HMD to fit snugly on the user's head with little or no movement between the frame and the user's head. A display housing 712 may be rotatably coupled to the frame 710 by a hub to permit the display housing 712 to be moved upward away from the user's eyes. When in operation, the display housing 712 may be disposed directly in front of the user's eyes such that a pair of lenses 714 and electronic displays 716 contained in the housing, shown in broken lines, are in direct alignment with each of the user's eyes. The lenses 714 may be disposed between the user's eyes and the displays 716, and may be mounted to the housing such that each lens is disposed at an angle of between 1° and 15° relative to the visual plane defined by the displays 716. The lenses 714 may also be mounted such that the inter-optic distance between the lenses 714 may be adjusted, such as through a knob or wheel. The displays 716 may be any type of electronic display, such as, e.g., a liquid crystal display (LCD), cathode ray tube (CRT), light emitting diode (LED), or any other type of display.

Figure 8:
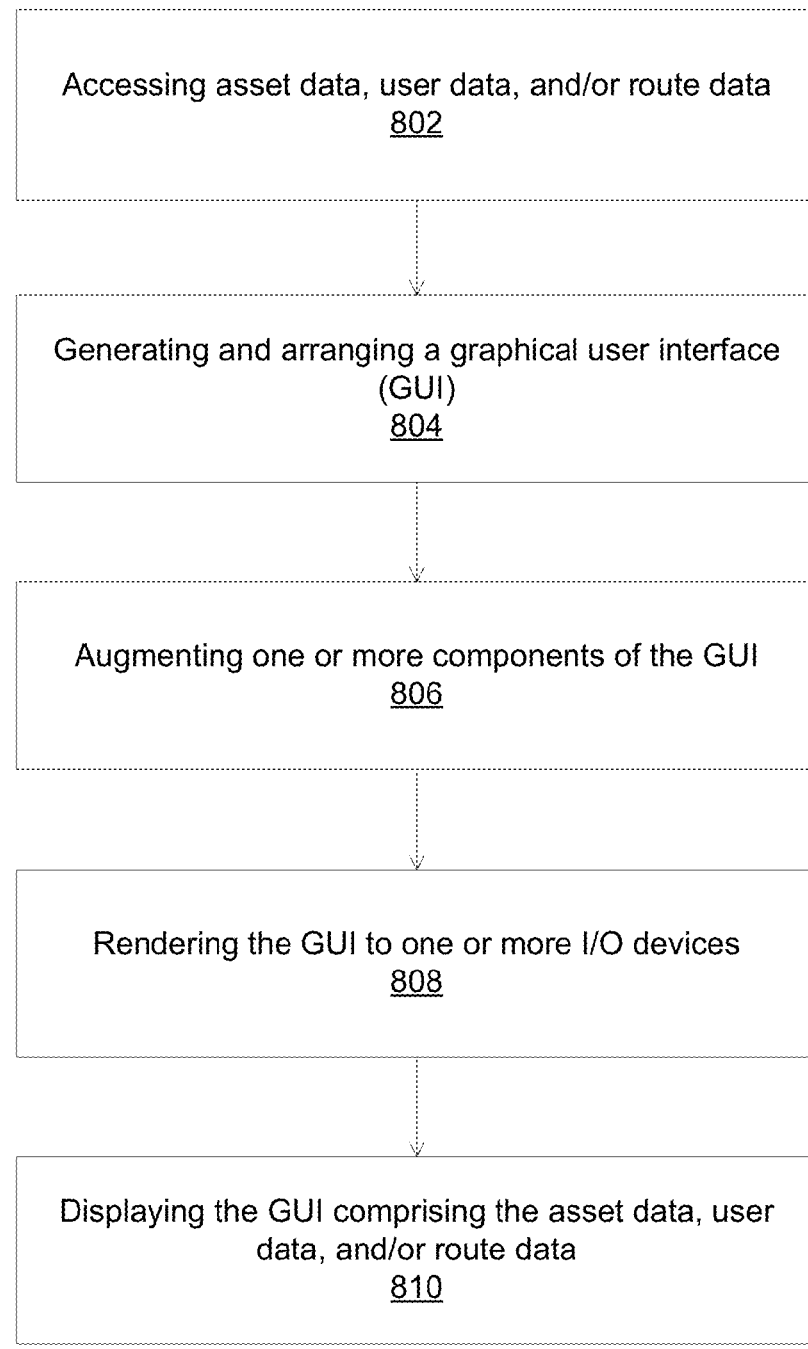
FIG. 8 is a flow diagram of a method for a graphical user interface, according to at least one embodiment.

FIG. 8 is a flow diagram of a method for a graphical user interface, according to at least one embodiment. Operation 802 accesses an asset data, a user data, and/or a route data. Asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. User data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. In addition, an input/output device may include an accelerometer sensor and/or gyroscope sensor that may help determine a position, a location and/or an orientation of the user. Route data may include data from a route optimization engine, such as the one described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes. Operation 804 generates and/or arranges a graphical user interface (GUI) based on the asset data, user data, and/or route data. Operation 806 augments one or more components of the GUI based on the asset data, user data, and/or route data. Operation 808 renders a graphical user interface to one or more input/output devices, such as a head-mount display (HMD). Operation 810 displays the GUI comprising the asset data, user data, and/or route data to the one or more input/output devices.

Figure 9:
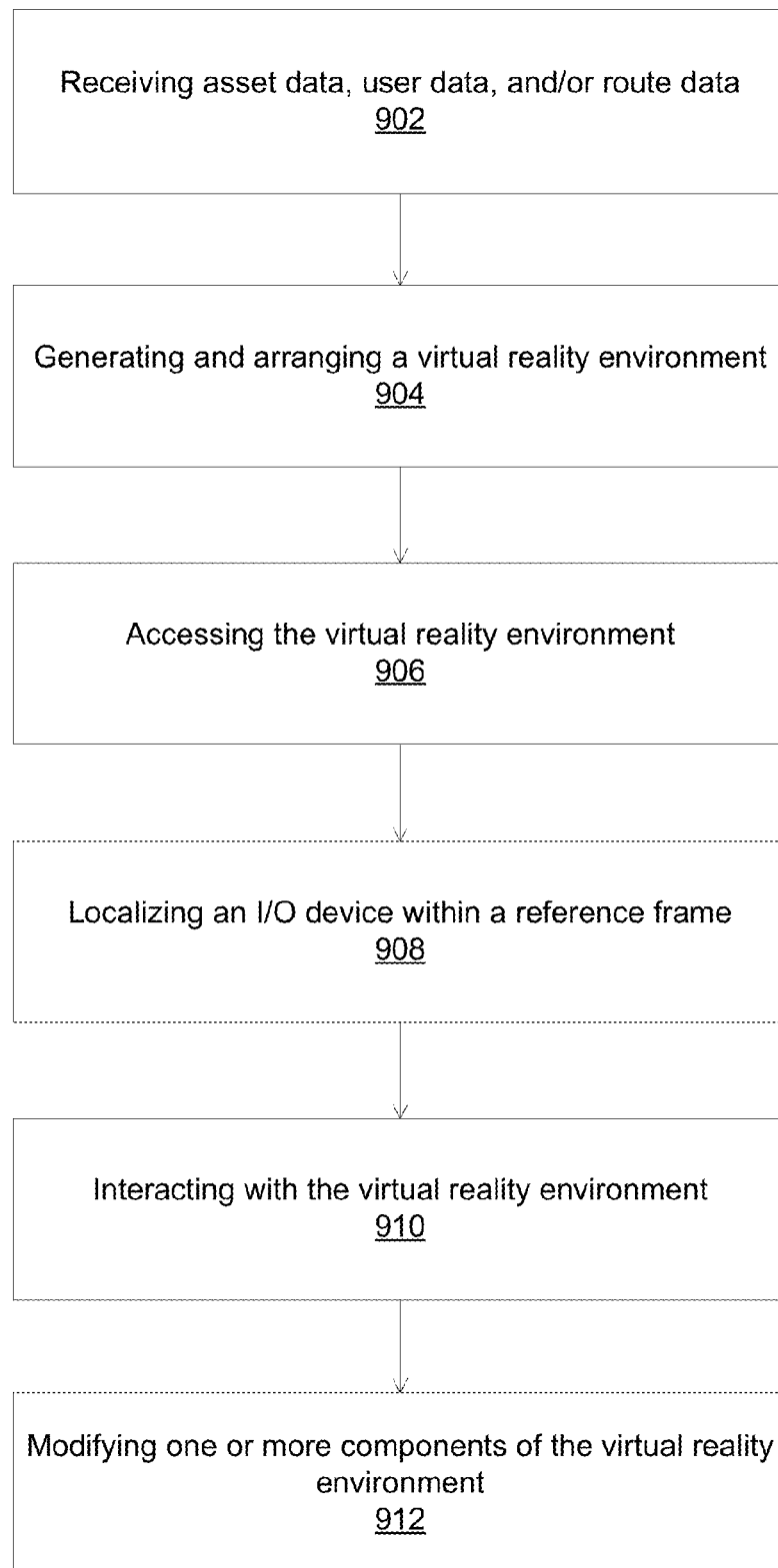
FIG. 9 is a flow diagram of a method for interacting with a virtual reality environment, according to at least one embodiment.

FIG. 9 is a flow diagram of a method for interacting with a virtual reality environment, according to at least one embodiment. Operation 902 receives an asset data, a user data, and/or a route data. Asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. User data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. In addition, an input/output device may include an accelerometer sensor and/or gyroscope sensor that may help determine a position, a location and/or an orientation of the user. Route data may include data from a route optimization engine, such as the one described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes. Operation 904 generates and/or arranges a virtual reality environment based on the asset data, user data, and/or route data. Operation 906 accesses the virtual reality environment with an input/output device, such as, e.g. an HMD. Operation 908 localizes the HMD within a reference frame of a captured image to provide the virtual reality environment based on the absolute position and orientation within the reference frame. Operation 910 interacts with the virtual reality environment, which may require a user to, e.g. click on a link or a three dimensional cube, scrolling a page, selecting a map, and etc. Operation 912 modifies one or more components of the virtual reality environment in real-time or non-real-time based the asset data, user data, and/or route data, such as, e.g., predicted current traffic data and/or predicted future traffic data.

Figure 10:
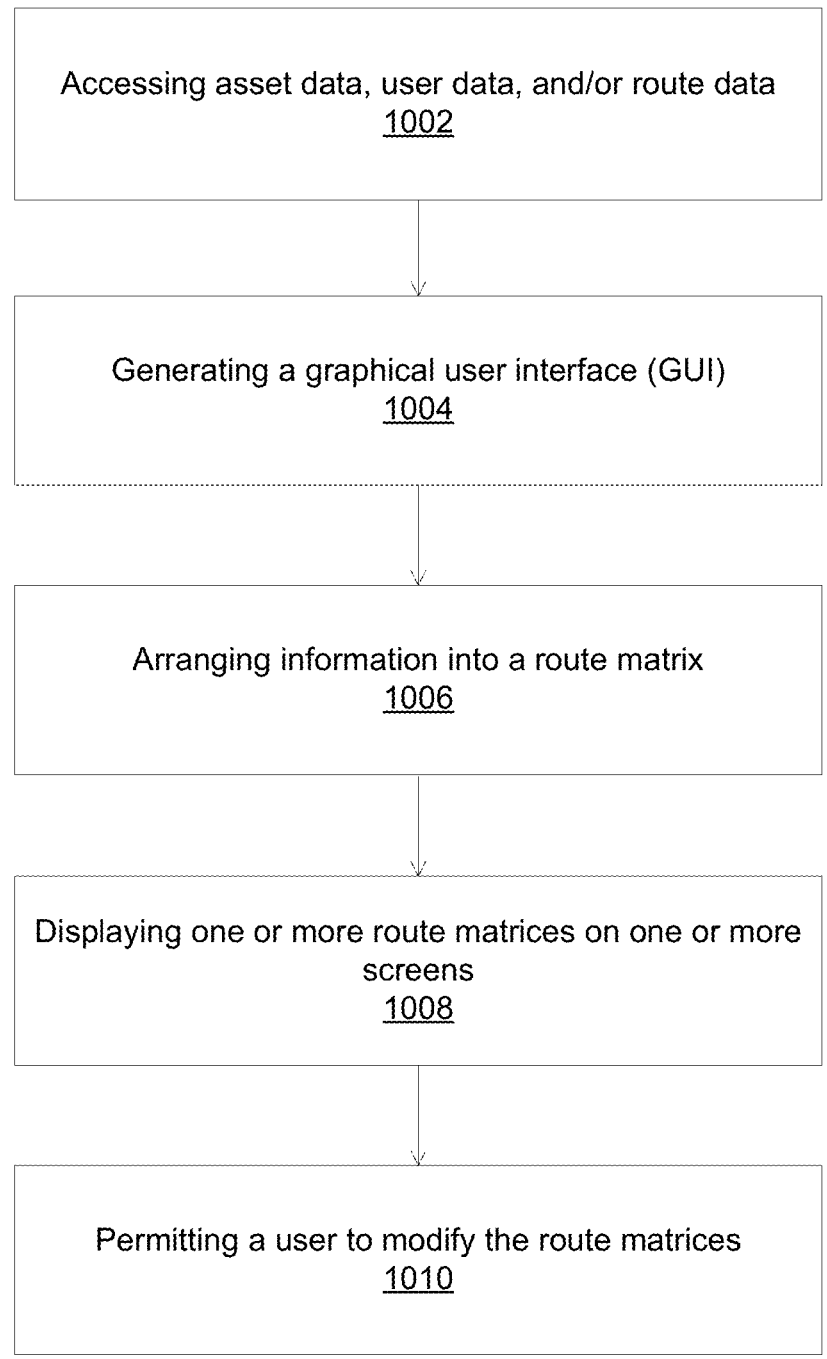
FIG. 10 is a flow diagram of a method for a graphical user interface to display a route matrix, according to at least one embodiment.

FIG. 10 is a flow diagram of a method for a graphical user interface to display a route matrix, according to at least one embodiment. Operation 1002 accesses an asset data, a user data, and/or a route data. Asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. User data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. In addition, an input/output device may include an accelerometer sensor and/or gyroscope sensor that may help determine a position, a location and/or an orientation of the user. Route data may include data from a route optimization engine, such as the one described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes. Operation 1004 generates a graphical user interface (GUI) based on the asset data, user data, and/or route data. Operation 1006 arranges the information into a route matrix. The matrix may be presented in two dimensions and may be divided by routes represented by one-dimensional line segments comprising one or more node 200. Each node 200 of a route may indicate a particular place or location of a geographic area, such as a destination on the route. The nodes may comprise various unique symbols to indicate destination status, such as a starting destination, a pending destination, a current destination, a visited destination, and an end destination. Operation 1008 displays one or more route matrices on one or more screens of the graphical user interface. Separate route matrices may be displayed on each of the multiple screens. Each matrix may comprise a plurality of routes, e.g., 1-1,000 routes (or more), allowing an administrator of the system to efficiently monitor a large total number of assets simultaneously, such as in the hundreds, e.g. 100 to 999 routes, or in the thousands, 1,000 to 999,999 routes, which prior art systems may not be able to accomplish. A single large screen comprising up to 999,999 routes of one or more matrices may also be employed. Operation 1010 permits a user to modify the route matrices.

In at least one embodiment, the present invention allows for complete control over a fleet of assets in the real world or in a simulated fleet training environment, from within a virtual reality environment. In addition to the route operation matrix, the virtual reality environment may present to a user a variety of software-based applications to monitor, track, and interact with the asset fleet. For example, individual screens of a plurality of screens of the virtual reality environment may display a map, a chat board or forum, a route comparison chart, a route timeline, a route summary or report, an activity feed, a warehouse and/or inventory management data, and may also allow for route modifications and/or a manual override of a tracked asset, such as to take over its wheel from within the virtual reality environment. In some embodiments, the system may allow an administrator to playback a virtual movie of an operator or asset's entire route, in the view of one or more asset-mounted cameras on the asset. The movie may be fast-forwarded, rewound, paused, and zoomed, and may display information such as asset speed, location, altitude, and heading.

In some embodiments, a 2D or 3D map comprising one or more routes of an asset fleet may be displayed on a screen of a virtual environment. The map may include geographic data, coordinates data, user and asset data, and route data that may pertain to a particular geographic region. The user and asset data, e.g., GPS tracking data, may be shown with spatial clustering enabled or disabled. Disabling spatial clustering may allow for the ability to view all operators and assets in a fleet independently and with the precise location of each asset on the map. The tracking data may include geo-fence data, e.g., alerting the administrator when an operator or asset enters a geo-fence area, and route deviation data, e.g., alerting the administrator when an operator or asset deviates from the planned or sequenced route. The map may comprise 3D data visualization, zoom functionality, and rotatable y-axis, or x-axis (and z-axis if the map is 3D).

The system administrator may interact with the map and routes, such as to dispatch one or more operators or assets to congregate at one or more locations by selecting one or more points on the map, or to assign an address or a route to a user or asset. Each route may be selectable, e.g., clickable, which may then show information about the routes, e.g., estimated time of arrival, asset check-in, total distance, and travel time. The route data may be updated in real-time as traffic conditions change or as constraints are modified by the administrator. Multiple routes and route data may be compared side-by-side in separate views. Two or more individual routes may be merged together, which may produce a new sequence of destinations optimized based on predicted current and future traffic data and pre-defined constraints. The routes may also be merged together based on the comparison of the routes, such as, for example, a short route and a long route may be merged to produce an average-length route. A new universal departure point or ending destination may be set for the newly created route.

Modifications may be made to existing routes in progress, such as duplicating a route, removing a route, deleting a route, changing the start date and time of a route, adding or removing destinations of a route, and changing the address order or destination sequence of a route. The administrator may also select to optimize addresses to sequence an optimal driving route and directions, based on predicted current traffic data, predicted future traffic data, and one or more constraints set by the administrator and/or a system autonomous process. In some embodiments, the original route before modification may be displayed on a screen next to the newly modified route with the corresponding route data to provide ease of comparison.

The user or administrator of the system may use a cursor of a mouse or body gesture commands to interact with the map and routes in the virtual environment. A variety of gesture commands may be used and arbitrarily set for the plurality of interactive functions the system permits. For example, a new destination may be picked up from an address book and dropped into the desired position of a desired route on the map, or the administrator may tilt their head to re-route an operator or asset that the administrator is currently monitoring. If gesture command is used, the system may be interacted with gestures through a control device, an augmented reality brain scanning device, and/or a gesture recognition camera. The gesture recognition camera may be interacted by the user in two-dimensional space, or a couple of gesture recognition cameras may be interacted by the user in three dimensions, thus allowing more gesture variety and better gesture tracking and identification compared to a single camera in two dimensions. A gesture recognition device may also be embedded into the virtual reality headset, or may be integrated into the system to affect the viewpoint within the virtual reality headset environment.

A summary table of route metrics and information about operators and assets may be displayed on one or more of the virtual screens. Route data may be divided into sections, such as, e.g., operational data, utilization data, distance data, time data, rates data and density data. Operational data may include, e.g., progress data and number of stops or destinations of a route; utilization data may include, e.g., route operation cost data, fuel cost data, and route volume data; distance data may include, e.g., estimated distance and actual traveled distance; time data may include, e.g., estimated travel time, actual travel time, wait time, time in traffic, total service time, total time on site, route total time, stem in and stem out times, which may be defined as the time it takes to get from a supply depot to the first stop and the time is takes to get to the depot from the last stop, respectively; rates data may include, e.g., cost per mile and profit per mile; and density data may include, e.g., number of stops per distance, number of stops per time interval, transactions per time interval, number of stops per time interval spent on the road, number of transactions per time interval spend on the road, volume of delivery items on a route per stop, volume of delivery items on a route per distance, weight of delivery items on a route per stop, weight of delivery items on a route per distance, and number of delivery items on a route per distance.

An activity feed may be displayed to allow visibility into the activities of a route and its operators and assets. The activity log may allow an administrator to efficiently keep track of a fleet's operations, such as, e.g., operator check-in and check-out times, modifications to a route, notes added to a route, personnel reassignments, and route status alerts. A chat board or forum may be used separately or in conjunction with the activity feed, such as to allow communication among administrators, users, and assets.

In some embodiments, a system and a method of the present invention may generate a graphical interface of routes and assets in a timeline format. The timeline may comprise line segments pertaining to one or more routes and may comprise route data, such as, e.g., start time, end time, current time, starting destination, ending destination, current destination and visited destination and unvisited destination, and information that pertains to operators and/or assets, e.g., speed, location, idling status and congregation status. The timelines for multiple routes or assets may be displayed in parallel, allowing comparison between the routes and assets.

Constructing a timeline may include accessing route data, user data, and/or asset data from a data processing system, and arranging the information into a graphical representation in a timeline format. The timelines may be presented in the form of horizontal lines or bars, or vertical lines or bars, similar to a Gantt chart. Each line graph or bar graph may represent a timeline for a specific route or asset. The timelines may comprise telematics data corresponding to the assets of the routes, and may be configured to be correlated in time, thereby enabling a visual comparison of the routes. Other formats may also be possible, such as a table, chart, or other data comprising symbols with varying shape, color, size and/or other information that changes over a predetermined time interval. In addition, formats that comprises solely of texts rather than graphics are also within the scope of the present invention.

Figure 11:
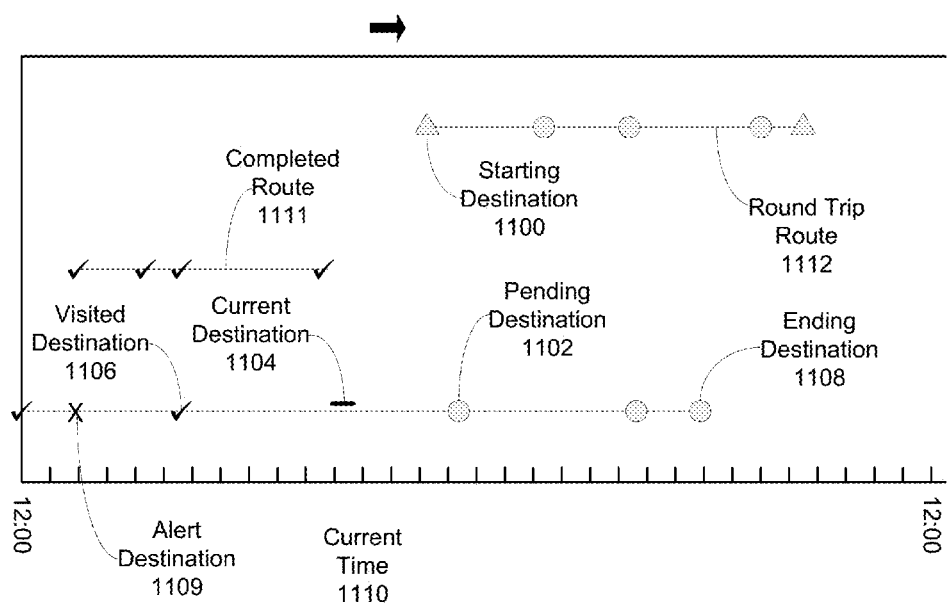
FIG. 11 is a graphical interface of routes and assets displayed in a timeline format, according to at least one embodiment.

FIG. 11 is a graphical interface of routes and assets displayed in a timeline format, according to at least one embodiment. The timelines may be presented in the format of horizontal lines or bars. The timelines may comprise telematics data corresponding to the assets of the routes, and may be configured to be correlated in time, thereby enabling a visual comparison of a plurality of routes. Each line graph or bar graph may represent a timeline for a specific route or asset, and may comprise varying start times and end times, which may be set by a user, an administrator, or a machine learning process.

One or more pins may be positioned on the graph that represents destinations of the route, and may be re-organized, such as to modify the route. The position of a pin may correlate with a destination position order among a plurality of destinations in the corresponding route, and may relate to a specific time of day, such as a scheduled delivery time at the destination. For example, a pin denoting a destination of one route may be picked up and inserted into a different position in the same route or a different route. Two or more existing pins may be interchanged, such as a couple of destinations swapping positions, three or more pins moving one or more positions in a round-robin schema, or any other configurations. In addition, a pin, and hence a destination, may be removed or added to any of the routes. When routes are modified, operators and assets of the affected route(s) may be notified of the change.

A pin correlating with an asset may be configured to move along the line or bar graphs in sync with the movement of an asset through a route (not shown), and to signify that the asset of the route is progressing through the route. For example, if the asset to which the pin is synchronized has progressed to the halfway mark of its route, then the pin may also be positioned at the halfway point on the line or bar that represents the route. The speed of the asset may also correlate with the movement speed of the pin along the graph, and may be displayed numerically on the pin upon a request by the user. The pins may include information about the asset and/or destination, e.g., address, customer name, and delivery instructions.

The pins may comprise various unique symbols to indicate destination status, such as a starting destination 1100, a pending destination 1102, a current destination 1104, a visited destination 1106, and an ending destination 1108. Typically, the first destination of the route is the starting destination 1100, which is indicated by a triangle shape in the figure. As a route progresses, lateral movement is observed on the timeline such that a destination where an asset or operator of the route is currently located may be marked with its own unique identifier, such as a dash mark. In general, if the current destination 1104 is lagging behind current time 1110, then it may indicate that the operator or asset is staying at the current destination 1104 longer than scheduled. The opposite is also true, wherein if the current destination 1104 is progressing in front of current time 1110, then it may indicate that the operator or asset is arriving at the current destination 1104 earlier than scheduled. The size, e.g., width and/or length of each pin may increase or decrease in conjunction with the duration of a service time for each destination. Service time may be defined as the amount of time spent at a destination to complete the intended operation or service.

A change in symbol of the starting destination, such as, to the symbol of a current destination 1104 may indicate that the route has begun implementation by an operator or asset assigned to the route. Once the operator or asset leaves the current destination 1104, it may then become the visited destination 1106 and may then be marked with its unique identifier, such as a checkmark. Generally, the current destination 1104 of the operator or asset of the route is the destination directly following the most recent visited destination 1106. Additionally, alert destination 1109 may require attention of the administrator, such as due to a problem with a customer, and may be marked, e.g., with a cross mark. A route that comprises all destinations that has changed from its initial symbol, such as a route with all checkmarks, may indicate that the route is a completed route 1111. On the other hand, a route that has one or more destinations comprising its initial symbol may indicate that the route is still in progress.

The initial symbol of the pending destination 1102 may indicate the type of destination, such as, e.g., a circle may indicate that it is a customer destination, and a triangle may indicate it is a starting destination and/or the destination is a storage facility. In the example of the figure, a triangle symbol located at the last destination may indicate that it is a round trip route 1112, if the symbol is referring to the same location or storage facility as the starting destination. Like symbols, such as the triangle symbol representing a same depot or a different depot may have further markings to differentiate, such as a numeric marking or an alphabet marking. However, the symbols may be interchangeable and may comprise any shape or graphical depiction.

In addition to unique graphical representations of the pins to indicate destination status, the pins may be color-coded, wherein a unique color scheme is used to indicate whether unvisited destinations are expected to be visited ahead of schedule, on schedule, or behind schedule. Visited destinations may also be color-coded to indicate whether actual visited times by the operator or asset were ahead of schedule, on schedule, or behind schedule. The color-scheme may have gradient levels of shading to indicate degree levels of a destination's expected and actual visited times in relation to its scheduled time. For example, if a destination is indicated with the color red when the destination is expected to be visited behind schedule, and if a destination is indicated with the color green when the destination is expected to be visited is ahead of schedule, then a destination that is expected to be on-time may have a color that is a blend of red and green, such as yellow. Different degrees of the gradient may also be used, for example, if the destination is expected to be visited slightly early (between on-time and ahead-of-schedule), then a color mixture of yellow and green may be used, such as light green. The opposite may also be true, wherein if a destination is expected to be visited slightly late (between on-time and behind-of-schedule), then a color mixture of yellow and red may be used, such as orange.

In some embodiments, graphical timelines may be used to track hundreds, thousands, or even tens of thousands of assets when implemented in a virtual reality environment, such as the ones described in FIG. 4 and FIG. 5. The system and the method herein can be implemented in real-time or non-real time, such as to playback the pin activities and current time bar of the timeline to a predetermined time and day.

Figure 12:
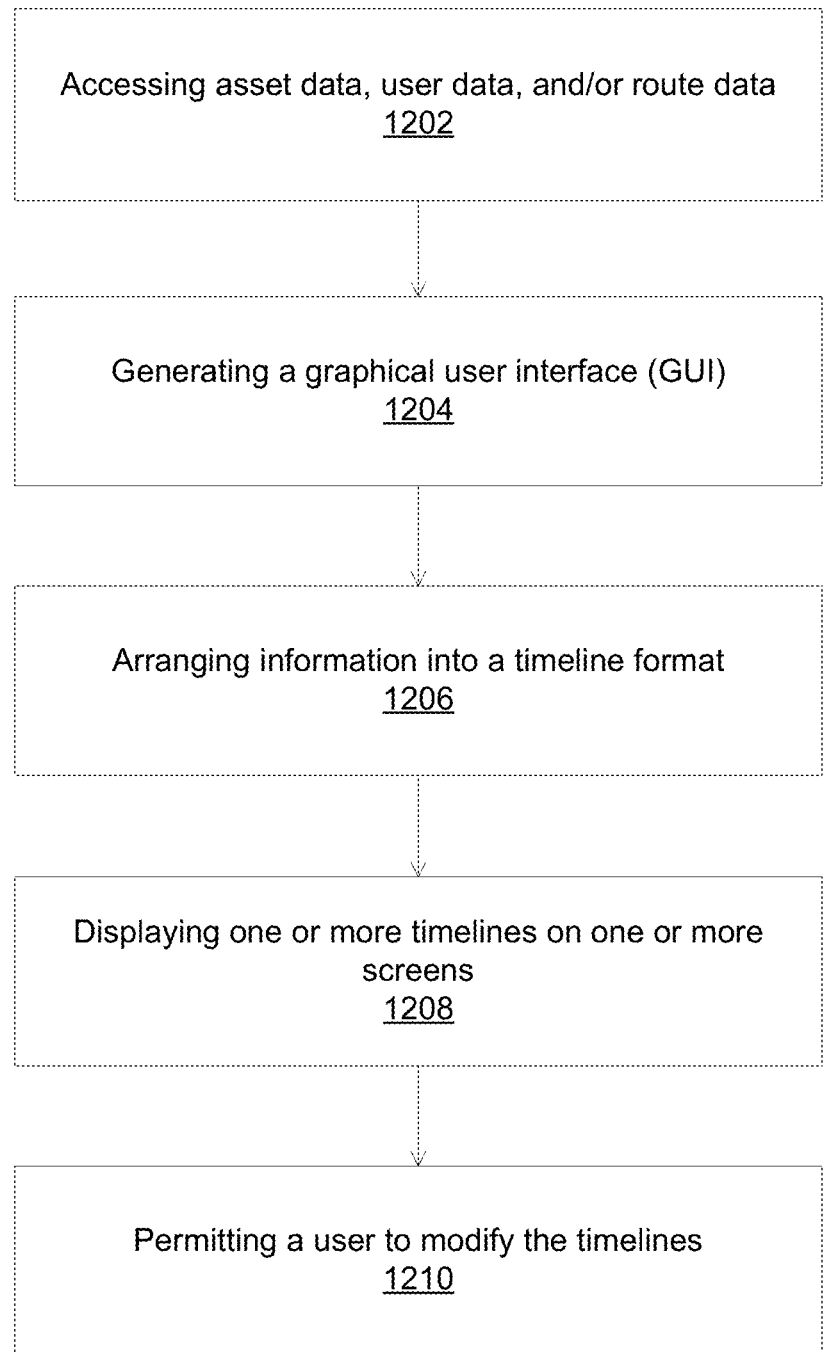
FIG. 12 is a flow diagram of a method for a graphical user interface arranged in a timeline format, according to at least one embodiment.

FIG. 12 is a flow diagram of a method for a graphical user interface arranged in a timeline format, according to at least one embodiment. Operation 1202 accesses an asset data, a user data, and/or a route data. Asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. User data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. In addition, an input/output device may include an accelerometer sensor and/or gyroscope sensor that may help determine a position, a location and/or an orientation of the user. Route data may include data from a route optimization engine, such as the one described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes. Operation 1204 generates a graphical user interface (GUI) based on the asset data, user data, and/or route data. Operation 1206 arranges the information into a timeline format.

The timelines may be presented in the form of horizontal lines or bars, or vertical lines or bars, similar to a Gantt chart. Each line graph or bar graph may represent a timeline for a specific route or asset. The timelines may comprise telematics data corresponding to the assets of the routes, and may be configured to be correlated in time, thereby enabling a visual comparison of the routes. Other formats may also be possible, such as a table, chart, or other data comprising symbols with varying shape, color, size and/or other information that changes over a predetermined time interval. In addition, formats that comprises solely of texts rather than graphics are also within the scope of the present invention. Operation 1208 displays one or more timelines on one or more screens of the graphical user interface. The timelines may be used to track hundreds, thousands, or even tens of thousands of assets when implemented in a virtual reality environment, such as the ones described in FIG. 4 and FIG. 5. The system and the method herein can be implemented in real-time or non-real time, such as to playback the pin activities and current time bar of the timeline to a predetermined time and day. Operation 1210 permits a user to modify the timelines.

In some embodiments, a warehouse or a facility may be displayed in a three dimensional virtual environment, such as to a user of a VR device, e.g., HMD. One or more cameras may be positioned within the warehouse to retrieve visual data of the warehouse, such as inventory data, infrastructure data, and human and machine operator data. Inventory data may comprise stock keeping unit (SKU) data and inventory count data, such as to indicate the stock level of an item; infrastructure data may comprise shelf data, pallet data, rack data, aisle data, entrance and exit data; human operator data may comprise data on the presence of warehouse workers and their work-title; and machine operator data may comprise any machine that may be used to carry out the operations of a warehouse, such as a forklift.

Through the use of visual imaging techniques, such as superimposed graphical shapes, numbers arrows, colors, frames, and translucent imageries, the warehouse data may be presented in an intuitive graphical format. The system may allow the user of the system to virtually walk around the warehouse in real-time or non-real time. Real-time may allow the user to visualize current inventory information from within the warehouse to plan future routes accordingly. Non-real time may allow the user to playback the warehouse environment and data to a predetermined time and day. The virtual environment may also be zoomed in or zoomed out to any particular area of a warehouse.

The present invention may allow the user or administrator to view and interact with a virtual reality representation of the warehouse in real-time from a remote location, such as a command center. Example benefits of the system may include the ability to locate outdated and obsolete inventory, identify available shelving space, track stock movements, and monitor human resources of the warehouse. However, the invention is not so limited, and may be implemented in any type of storage facility such as shipping assets and academic libraries.

In some embodiments, the present invention allows an administrator of the system to dynamically customize and modify a virtual reality environment for managing an asset fleet of a user of the virtual environment. A backend server may comprise a control utility that may permit the administrator to modify the user interface to personalize for the user, or to customize for business or fleet operational goals. For example, the user may be assigned to monitor and manage a plurality of driving routes of an asset fleet in the virtual reality environment, and may have physical and/or mental disabilities, e.g., nearsightedness, left-hand user, and attention deficit disorder (ADD). Through the system, the administrator may present the virtual environment to the user to accommodate the user's disabilities, such as to provide the correct font size, screen layout position and orientation, and picture brightness and contrast. In addition, the modification may be based on real-time or non-real time, and predicted current and/or predicted future traffic conditions. As another example, the virtual environment may be modified to present to the user screens that comprise multiple route matrices or route timelines by over-riding previous displays that was present on the screens, e.g., warehouse and inventory data, due to a severe weather condition on a present day that is impacting one or more routes of the business or fleet. Due to the weather condition, the impacted routes may require immediate attention, which the system and/or administrator may have noticed, and in turn modified the user's virtual reality interface in response.

Figure 13:
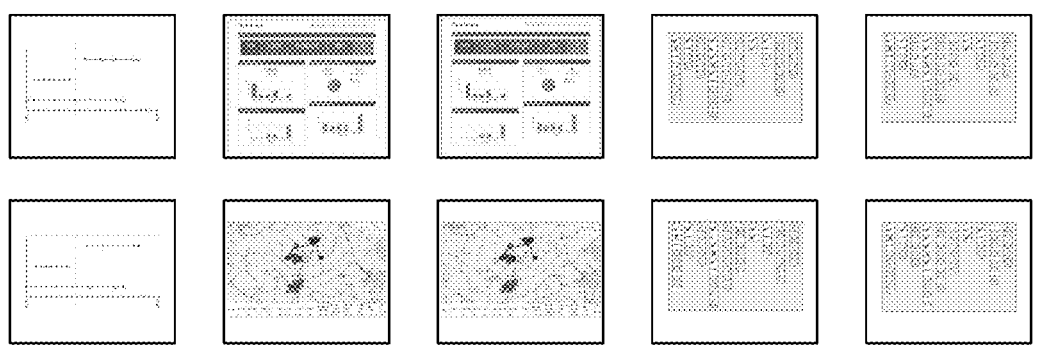
FIG. 13 is an example virtual reality environment customized by a system of the present invention, according to at least one embodiment

FIG. 13 is an example virtual reality environment customized by a system of the present invention, according to at least one embodiment. The system or a system administrator may modify the user interface of a user to personalize for the user, or to customize for the business or fleet operations, and may allow for complete control over a fleet of assets in the real world or in a simulated fleet training environment. In addition to a route operation matrix, the virtual reality environment may present to a user a variety of software-based applications to monitor, track, and interact with the asset fleet. For example, individual screens of a plurality of screens of the virtual reality environment may display a map, a chat board or forum, a route comparison chart, a route timeline, a route summary or report, an activity feed, a warehouse and/or inventory management data, and may also allow for route modifications and/or a manual override of a tracked asset in real-time, such as to take over its wheel from within the virtual reality environment. In some embodiments, the system may allow an administrator to playback a virtual movie of an operator or asset's entire route, in the view of one or more asset-mounted cameras on the asset. The movie may be fast-forwarded, rewound, paused, and zoomed, and may display information such as asset speed, location, altitude, and heading.

Figure 14:
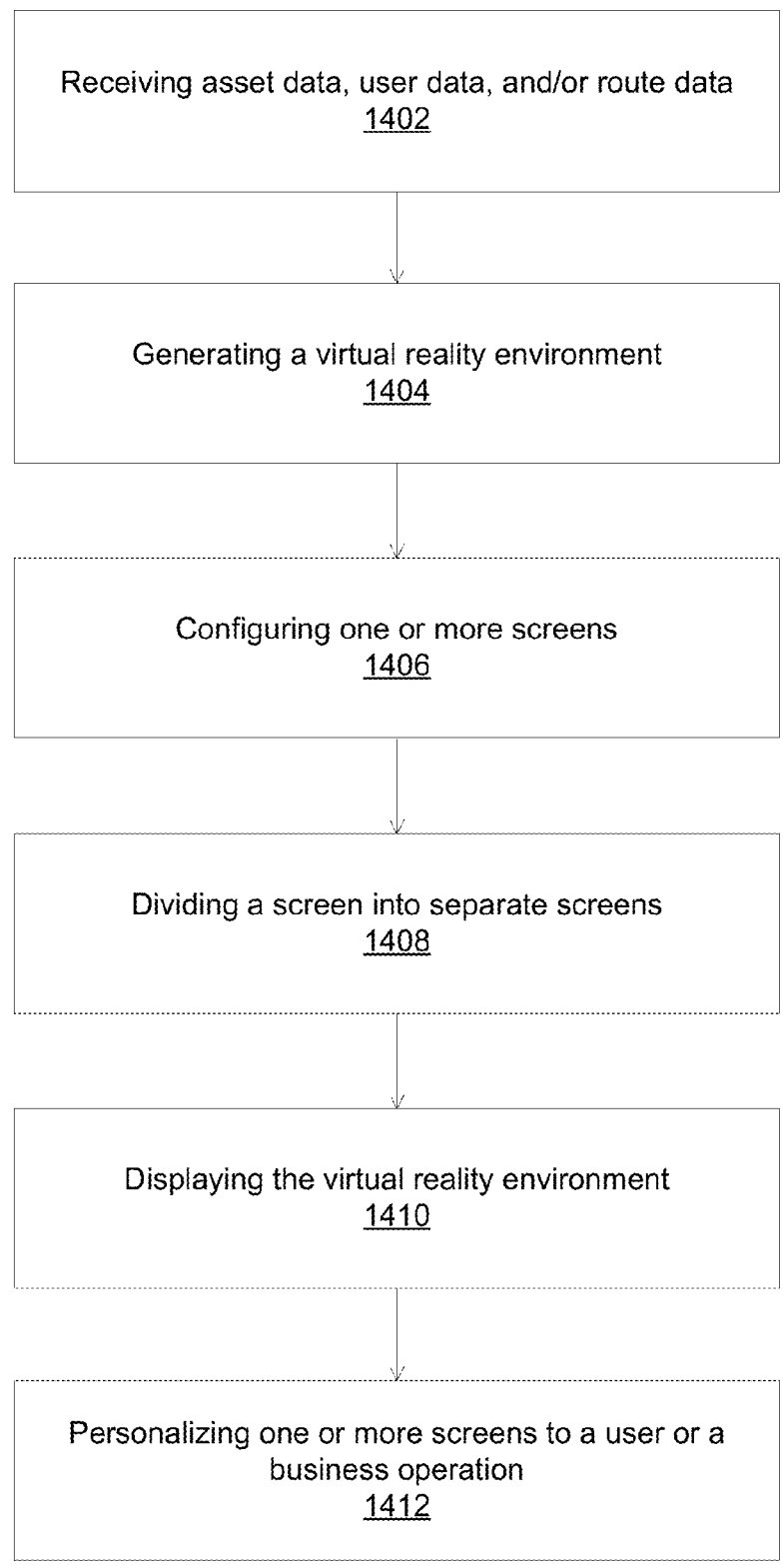
FIG. 14 is a flow diagram of a method for a virtual reality environment comprising one or more screens, according to at least one embodiment.

FIG. 14 is a flow diagram of a method for a virtual reality environment comprising one or more screens, according to at least one embodiment. Operation 1402 receives an asset data, a user data, and/or a route data. Asset data can include, but is not limited to asset navigation data, e.g., location data, orientation data, interior and exterior data, direction data, destination and point-of-interest data, and asset systems and components data, e.g., motion data, velocity data, direction data, acceleration data, yaw rate data, steering rate data, steering wheel position data, brake position data, throttle position data, transmission gear position data, operator command data, dynamic car response data, and steering angle data. User data may include, e.g., tracking data, interaction data, position and orientation data, motion data, location data, and user input data. For example, the user data can be based on data from vision sensors, e.g., cameras, gesture/motion sensors, tracking systems, the HMD, and other sensors and systems. The user data may also include health data about the user, such as from health monitoring devices, e.g., portable medical devices worn by the user. In addition, an input/output device may include an accelerometer sensor and/or gyroscope sensor that may help determine a position, a location and/or an orientation of the user. Route data may include data from a route optimization engine, such as the one described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes. Operation 1404 generates a virtual reality environment based on the asset data, user data, and/or route data. Operation 1406 configures one or more screens in three-dimensional space in relation to position, height, width, and rotation. The screen frames may be transparent or translucent, and may comprise selectable options embedded within the screens in the form of links and buttons. Operation 1408 divides a screen into separate screens, such as a left screen, a middle screen, and a right screen. In some embodiments, a single screen may be used in substitute of the multiple screens, and multiple screens may be divided into an infinite number of individual screens. The screens may also be divided into a set of top screens and a set of bottom screens for further organization. The system may allow the user to select among the multiple screens, and may be alerted to an activity on a target screen based on an alert signal within the virtual environment. A horizontal alert signal may prompt or instruct the user to divert attention to a screen either in the horizontal directions, e.g., left and right directions, and a vertical alert signal may prompt the user to divert attention to a screen in the vertical directions, e.g., top and bottom directions. Operation 1410 displays the virtual reality environment comprising the asset data, user data, and/or route data to one or more input/output devices. Operation 1412 personalizes one or more screens to a user or a business operation, including, e.g., amount of screens, layout and position, and design.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method, comprising:
   accessing at least one of a route data, an asset data and a user data;
   generating a virtual reality environment based on the at least one of the route data, the asset data and the user data;
   displaying the virtual reality environment; and
   permitting a user to interact with the graphical user interface;
   wherein the virtual reality environment comprises a plurality of screens;
   wherein the plurality of screens are organized by geographic regions, and
   wherein the geographic regions are compartmentalized by route density data.

2. The method of claim 1, further comprising:
   wherein the plurality of screens comprise at least one of a map, a summary table, an activity feed and a chat board,
   wherein the summary table comprises at least one of an operational data, utilization data, distance data, time data, rates data, and density data, and
   wherein the map permits a user to modify one or more routes using a gesture command.

* * * * *